United States Patent [19]
Dukatz et al.

[11] Patent Number: 5,224,756
[45] Date of Patent: Jul. 6, 1993

[54] INTEGRATED CHILD SEAT FOR VEHICLE

[75] Inventors: Matthew Dukatz, Bloomfield Hills; Fred C. Kresky, Rochester Hills; Jeffrey T. Lambert, Northville; James P. Lezotte, Redford; Robert W. Murphy, Farmington Hills; George S. Popa, Troy; Ronald S. Zarowitz, West Bloomfield, all of Mich.

[73] Assignee: The United States of America as represented by the Director of the National Security Agency, Fort George G. Meade, Md.

[21] Appl. No.: 932,597

[22] Filed: Aug. 20, 1992

Related U.S. Application Data

[63] Continuation of Ser. No. 699,375, May 14, 1991, abandoned.

[51] Int. Cl.⁵ .............................................. B60N 2/30
[52] U.S. Cl. .................................. 297/238; 297/114; 297/229; 297/467
[58] Field of Search ............... 297/238, 219, 229, 391, 297/396, 408, 484, 468, 483, 467, 114

[56] References Cited

U.S. PATENT DOCUMENTS

| | | |
|---|---|---|
| 1,965,048 | 7/1934 | Morris . |
| 2,337,480 | 12/1943 | Logan . |
| 2,436,294 | 2/1948 | Glatstein . |
| 2,584,481 | 2/1952 | Mast et al. . |
| 2,966,201 | 12/1960 | Strayler . |

(List continued on next page.)

FOREIGN PATENT DOCUMENTS

| | | |
|---|---|---|
| 0258194 | 3/1988 | European Pat. Off. . |
| 0286542 | 10/1988 | European Pat. Off. . |
| 2665399 | 2/1992 | |
| 2454573 | 5/1975 | Fed. Rep. of Germany . |
| 7612141 | 9/1976 | Fed. Rep. of Germany . |
| 2720954 | 12/1977 | Fed. Rep. of Germany . |
| 2807064 | 2/1978 | Fed. Rep. of Germany . |
| 3020212 | 12/1981 | Fed. Rep. of Germany . |
| 3716038 | 12/1987 | Fed. Rep. of Germany . |
| 2307673 | 11/1976 | France . |
| 2624805 | 6/1989 | France . |
| 59-156836 | 9/1984 | Japan . |
| 2023415 | 1/1980 | United Kingdom . |
| 2122886 | 1/1984 | United Kingdom . |

OTHER PUBLICATIONS

"Car Styling", Jan. 1982, drawings.
"Un Dispositif de Securite pour les Enfants Integre au Vehicule", Renault News Release, Dec. 19, 1989.
(List continued on next page.)

Primary Examiner—Peter R. Brown
Attorney, Agent, or Firm—John R. Utermohle; Thomas O. Maser

[57] ABSTRACT

A three-mode seat for a motor vehicle cooperable with an adult seat belt assembly to provide three modes of operation including an adult seat mode, a large child booster seat mode, and a small child mode. The seat includes a child's seat module arranged to be secured to the seat back frame between the space provided between two side cushions. The module includes a rigid back panel which carries a cushion assembly and a child's seat belt assembly. The cushion assembly includes a movable cushion assembly arrangement mounted for movement between (1) an adult mode position wherein the movable cushion assembly arrangement is disposed within the space between the side cushions and provides an adult back cushion for engaging the middle of the back of an adult seat occupant sitting on the seat cushion of the seat in an operative position, and (2) a child mode position wherein the movable cushion assembly arrangement extends from the space between the side cushions and the cushion assembly provides a cushioned child's seat extending from the bottom of the space in overlying relation to the seat cushion, a cushioned child's seat back extending upwardly from the cushioned child's seat within the space between the side cushions, and a cushioned child's head support above the cushioned child's seat back. The child's seat belt assembly is movable into a child's booster seat position enabling a large child to be retained therein by the adult seat belt assembly.

50 Claims, 8 Drawing Sheets

U.S. PATENT DOCUMENTS

| | | |
|---|---|---|
| 3,094,354 | 6/1963 | Bernier . |
| 4,230,366 | 10/1980 | Ruda . |
| 4,533,176 | 8/1985 | Wyttenbach . |
| 4,540,216 | 9/1985 | Hassel, Sr. .......................... 297/238 |
| 4,541,654 | 9/1985 | Jonasson . |
| 4,555,135 | 11/1985 | Freeland . |
| 4,596,420 | 6/1986 | Vaidya . |
| 4,664,443 | 5/1987 | Casale . |
| 4,665,503 | 4/1987 | Kamijo et al. . |
| 4,690,455 | 9/1987 | Bailey et al. . |
| 4,722,568 | 2/1988 | Irvin . |
| 4,756,573 | 7/1988 | Simin et al. .......................... 297/238 |
| 4,768,827 | 9/1988 | Musgrove . |
| 4,900,086 | 2/1990 | Steward . |
| 4,900,087 | 2/1990 | Crisp . |
| 4,913,498 | 4/1990 | Forlivio . |
| 4,936,627 | 6/1990 | Guim . |
| 4,936,631 | 6/1990 | Mochida et al. . |
| 4,943,112 | 7/1990 | Law . |
| 4,986,600 | 1/1991 | Leblanc et al. . |
| 5,026,118 | 6/1991 | Vander Stel et al. . |
| 5,100,199 | 3/1992 | Vander Stel et al. . |

OTHER PUBLICATIONS

"Owner's Manual Supplement Operating Instructions for Chrysler Integrated Child Seat", Chrysler Corporation, 1991, pp. 1–8.

Photograph, "Safety Hidden Away", 21591-S-P1, Chrysler Public Relations.

Photograph, "Toddler Tested for Two", 21591-S-P2, Chrysler Public Relations.

Photograph, "Safety Buckled In", 21591-S-P3, Chrysler Public Relations.

"Child's Safety Seat Wins Automotive Division Grand Award", Auto Plastic News, vol. 21, No. 4, Dec. 1991.

"Chrysler Lauded for Child Safety Seat", MGA News, Feb. 1992.

"Chrysler Minivans Offer First Child Seats", Denver Post, Nov. 1, 1991.

"Safety Sells . . . Chrysler's Built-In Child Seats are Hot . . . ", Detroit News, Apr. 15, 1992.

"Auto Motor und Sport", vol. 21, Oct. 2, 1992, pp. 62, 63, 64 and 66 and English translation thereof.

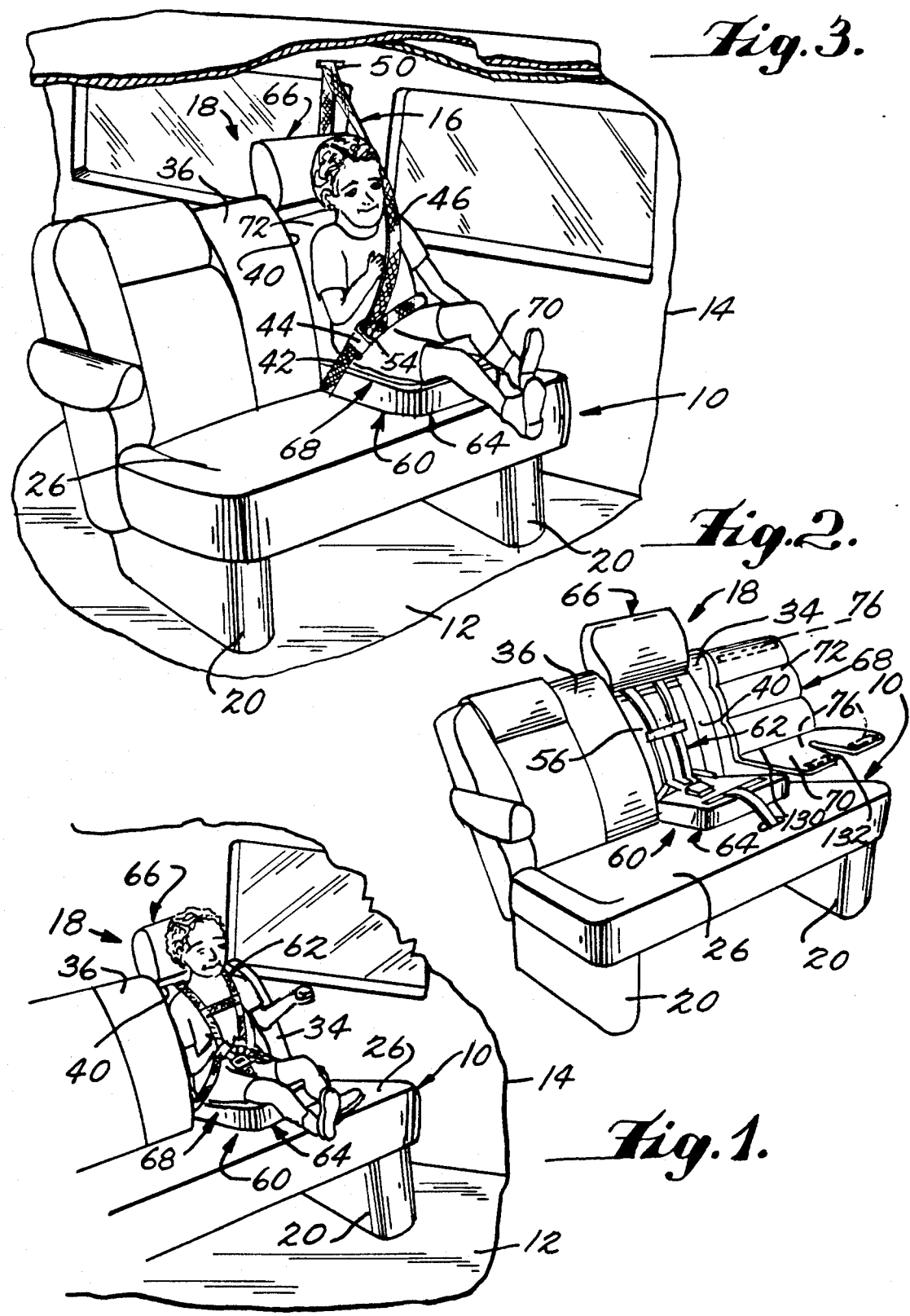

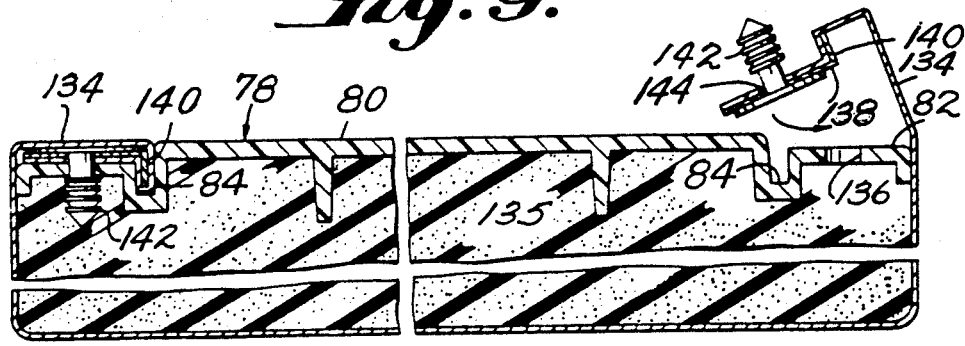
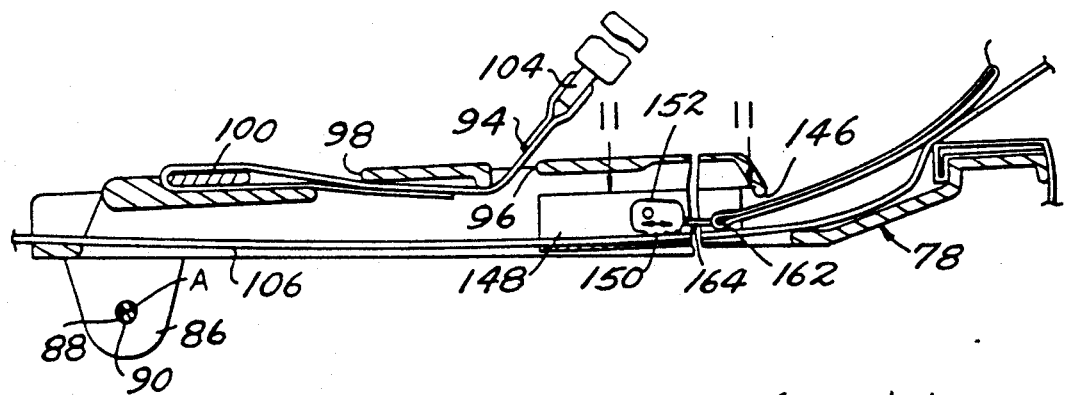
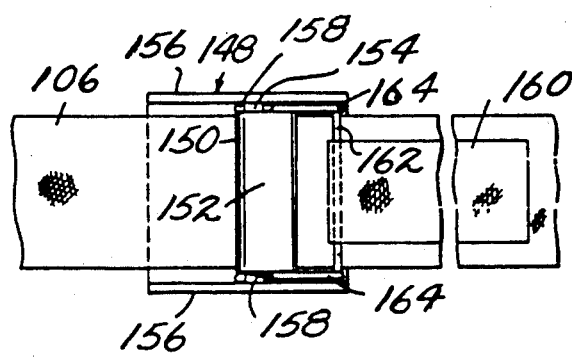

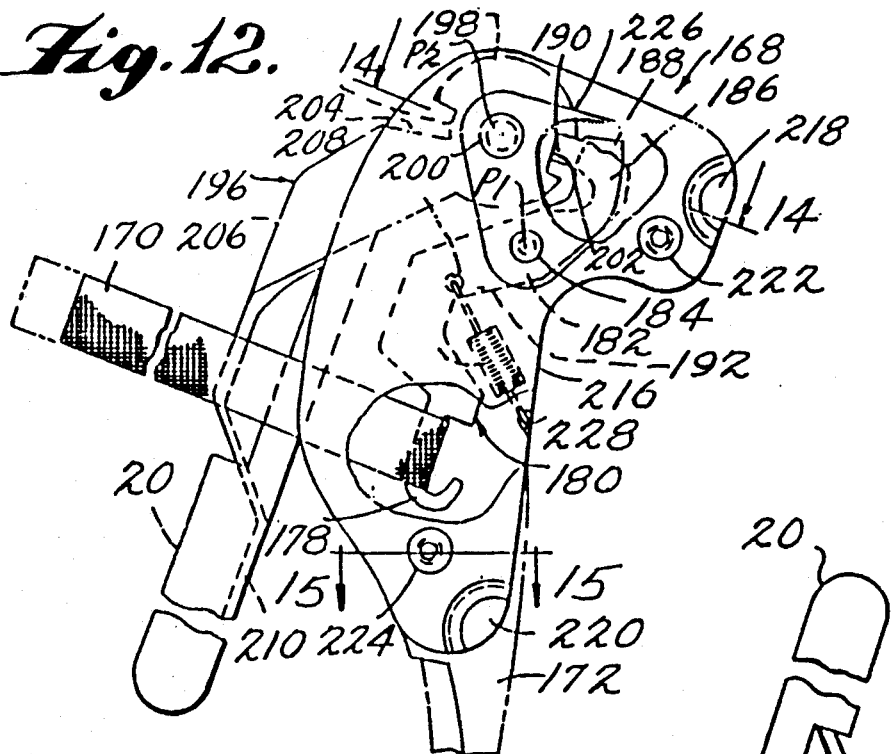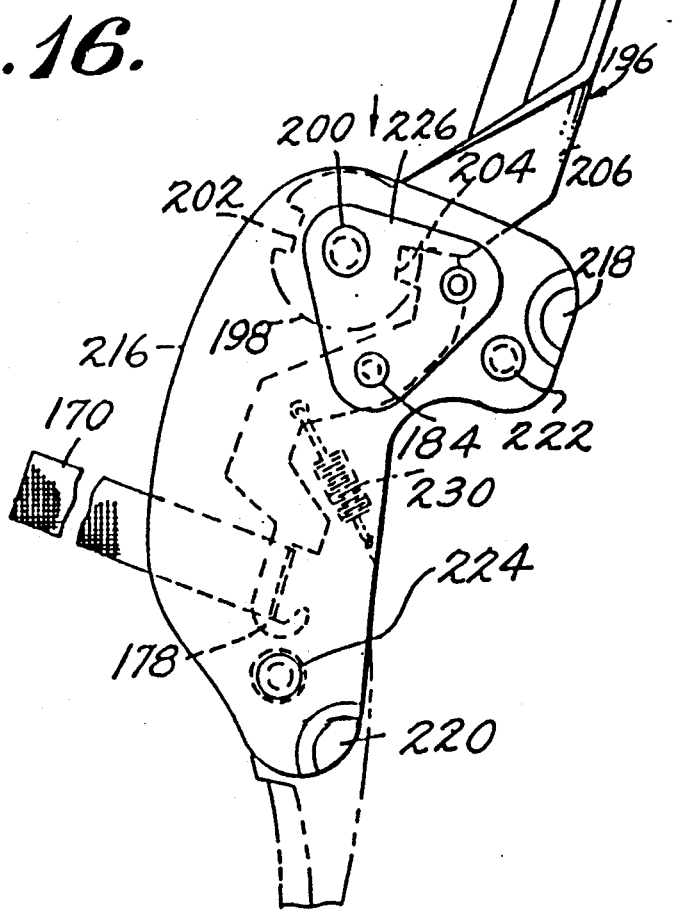

INTEGRATED CHILD SEAT FOR VEHICLE

This is a continuation of application Ser. No. 699,375 filed, May 14, 1991, now abandoned.

This invention relates to vehicle seats and more particularly to integrated seats for motor vehicles capable of being moved between an adult mode position and a child mode position.

Integrated seats which contemplate both a child and an adult mode are to be contrasted with the general practice which exists wherein the seats provided are adult seats and separate child seat units are used to accommodate children. The usual situation is that the separate units contain their own seat belt assemblies or occupant restraints and the separate child's unit is affixed to the existing adult seat by strapping the separate child unit to the adult seat by the adult seat belt assembly.

A characteristic of the separate child unit commercially available is that they are used for limited periods of time during the growth years. For example, it is usual to provide a separate infant unit which is used only during the first year or until the child reaches a weight of about twenty pounds. Thereafter, a different separate child's unit must be used. During the period from one year up to six or seven, the child's weight and dimensions increase significantly and the child's ability changes from one in which an adult must interface the child with the seat and restraint system to one in which the child becomes capable of interfacing with the seat and restraint system.

It is well known that separate child seat units present a measure of inconvenience in installation in that some time and effort is required to install the separate child's unit on the adult seat when it is desired to have the seat used by a child and to remove the installed child seat when it is desired to have the seat used by an adult.

The patented literature contains many proposals for eliminating this inconvenience inherent in the use of separate child seat units by providing an integrated seat structure capable of being easily and conveniently moved between an adult mode position and a child mode position. Examples of such patented literature include U.S. Pat. Nos. 4,540,216, 4,756,573, 4,900,087, 4,943,112, and 4,986,600, British Patent No. 2,023,415, and German Offenlegungsscrift 27 20 954.

To date, these proposals have not received any widespread use. The present invention is based upon the underlying thought that, in order for an integrated seat to achieve widespread acceptance, it must be capable of conveniently accommodating children for a number of years as, for example, from one to six or seven during which the growth changes already mentioned take place. In accordance with the principles of the present invention, this accommodation is made by providing a seat which has three modes of use, namely, an adult mode, a small child mode (e.g. from twenty to forty pounds) and a large child mode (above forty pounds). The principles of the present invention enunciated above can be carried out by providing a three-mode seat for a motor vehicle cooperable with an adult seat belt assembly in which the three-mode seat comprises a seat for an automotive vehicle cooperable with an adult seat belt assembly which comprises three modes of operation including an adult seat mode, a large child booster seat mode, and a small child mode, said three-mode seat comprising a rigid frame for securement within the automotive vehicle interior, a seat cushion carried by the rigid frame in a position to enable an adult occupant of the motor vehicle to sit thereon in an operative position to secure the adult seat belt assembly in operative relation over the adult occupant's shoulder and waist. A rigid seat back frame is mounted with respect to the rigid frame in an operative fixed relation and has side cushions carried thereby in positions to be engaged by opposite sides of the back of an adult seat occupant sitting on the seat cushion in the operative position. The side cushions are spaced apart a distance sufficient to define a child receiving space therebetween of a size to enable a child to be disposed therebetween. A cushion assembly is mounted on the seat back frame which includes a movable cushion assembly arrangement mounted for movement between (1) an adult mode position wherein the movable cushion assembly arrangement is disposed within the space between the side cushions and provides an adult back cushion for engaging the middle of the back of an adult seat occupant sitting on the seat cushion in the operative position, and (2) a child mode position wherein the movable cushion assembly arrangement extends from the space between the side cushions and the cushion assembly provides a cushioned child's seat extending from the bottom of the space in overlying relation to the seat cushion, a cushioned child's seat back extending upwardly from the cushioned child's seat within the space between the side cushions, and a cushioned child's head support above the cushioned child's seat back. A small child's seat belt assembly is connected with the seat back frame and extends forwardly of the cushioned child's seat back for extension over the shoulders of a small child sitting on the cushioned child's seat. The cushioned child's seat provides a rigid anchor point for the small child's seat belt assembly between the legs of a small child sitting on the cushioned child's seat. The small child's seat belt assembly is disposed within the space when the movable cushion assembly arrangement is in the adult mode position and is movable into a child's booster seat position when the movable cushion assembly arrangement is in the child mode position enabling the cushioned child's seat, the cushioned child's seat back and the cushioned child head rest to act as a booster seat for a large child capable of being retained therein by the adult seat belt assembly extending in operative relation with the large child's shoulder and waist.

In its broader aspects the present invention contemplates an integrated seat of the type described in which the cushion assembly and child's seat belt assembly is integrated with the seat back frame, however, a preferred integrated arrangement is to provide the cushion assembly and child's seat belt assembly as a part of a child's seat module capable of being mounted on a conventional seat modified to accept the module. Accordingly, another object of the present invention is to provide a child's seat module for mounting on the back seat frame of a vehicle seat having a seat cushion and spaced apart side cushions on the back seat frame defining a child-receiving space therebetween in which the child's seat module comprises a rigid back panel of a size to fit within the space between the side cushions for engaging with the seat back frame forwardly thereof within a rearward portion of the space between the side cushions for fixed securement thereto. A cushion assembly is mounted on the back panel including upper and lower movable cushion assemblies mounted for movement between (1) an adult mode position wherein the movable cushion assemblies are disposed within the space between the side cushions and provide an adult back cushion for engaging the middle of the back of an adult seat occupant sitting on the seat cushion, and (2) a child mode position wherein the movable cushion assemblies extend from the space between the side cushions and the cushion assembly provides a cushioned child's seat including the lower movable cushion assembly extending from the bottom of the space in overlying relation to the seat cushion, a cushioned child's seat back extending upwardly from the cushioned child's seat within the space between the side cushions, and a cushioned child's head support including the upper movable cushion assembly above the cushioned child's seat back. A child's seat belt assembly is connected with the back panel and extends forwardly of the cushioned child's seat back for extension over the shoulders of a child sitting on the cushioned child's seat. The lower movable cushion assembly provides a rigid anchor point for the small child's seat belt assembly between the legs of a small child sitting on said cushioned child's seat.

Other objects of the present invention include the provision of a three-mode seat and/or a child's seat module of the type described which is simple in construction, effective in operation and economical to manufacture.

These and other objects of the present invention will become more apparent during the course of the following specification and claims.

The invention can best be understood in conjunction with the accompanying drawings wherein illustrated embodiments are shown.

In the drawings:

FIG. 1 is a fragmentary perspective view of a three-mode seat embodying the principles of the present invention showing the seat installed in a motor vehicle in cooperating relation with the adult seat belt assembly of the motor vehicle and disposed in its small child mode position with a small child therein;

FIG. 2 is a view similar to FIG. 1 showing how the child's seat belt assembly is moved into its booster seat position to enable the seat to act as a booster seat while in its child mode position;

FIG. 3 is a view similar to FIG. 1 showing the seat in its child mode position wherein the seat acts as a booster seat for a large child retained therein by cooperation with the adult seat belt assembly;

FIG. 9 is an enlarged cross-sectional view taken along the line 9—9 of FIG. 5;

FIG. 10 is an enlarged cross-sectional view taken along the line 10—10 of FIG. 6;

FIG. 11 is an enlarged cross-sectional view taken along the line 11—11 of FIG. 10;

FIG. 12 is an enlarged side elevational view of one latch mechanism in the child's seat module in one operational position;

Figure 13:
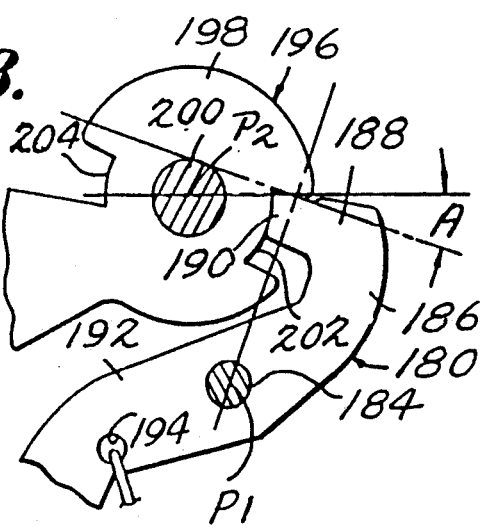
FIG. 13 is an enlarged view of a portion of the latch mechanism shown in FIG. 12.
Figure 17:
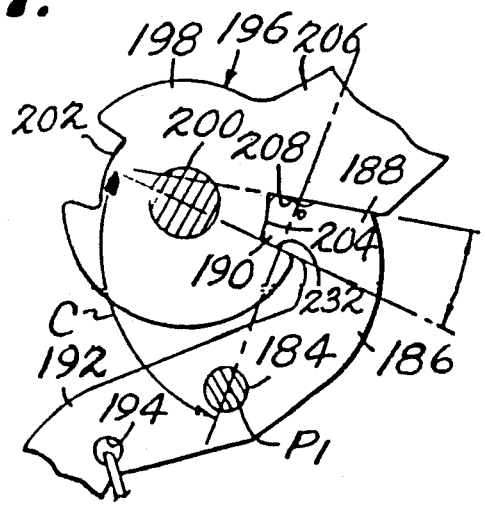
Figure 14:
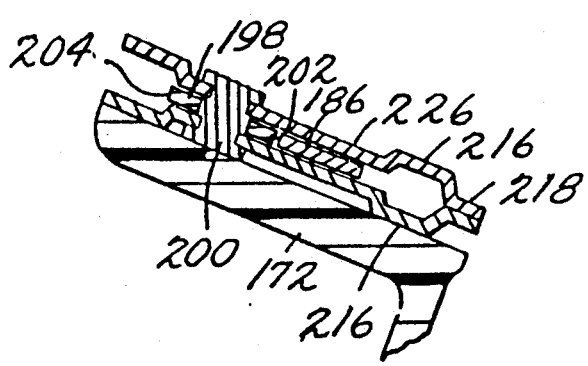
Figure 15:
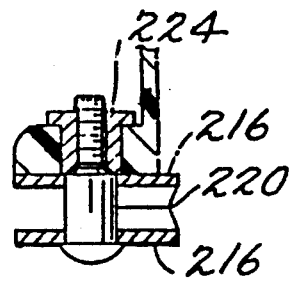
Figure 18:
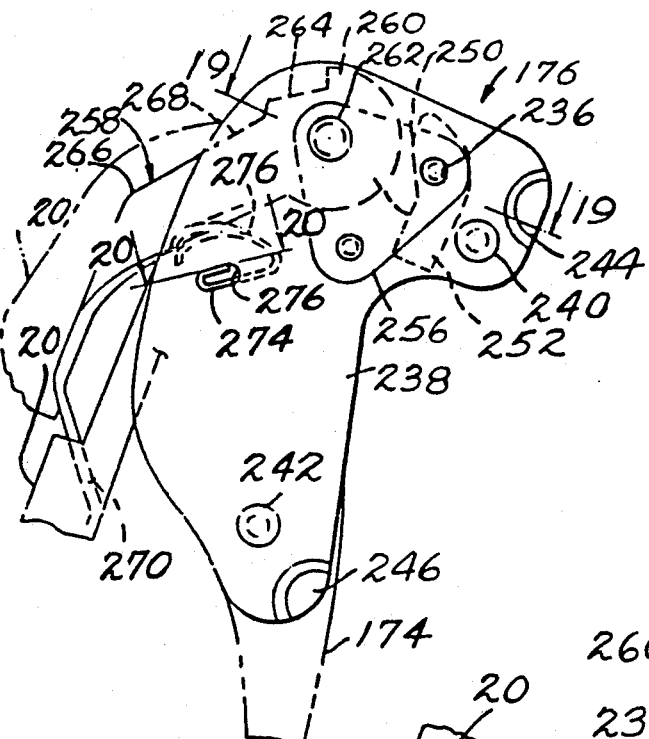
Figure 19:
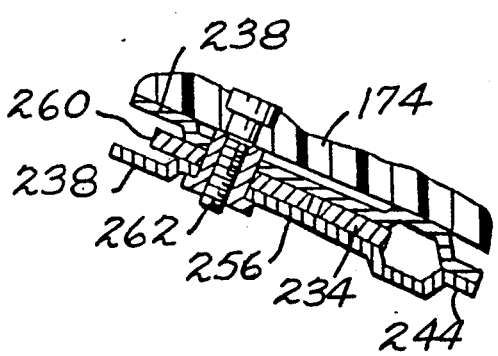
Figure 21:
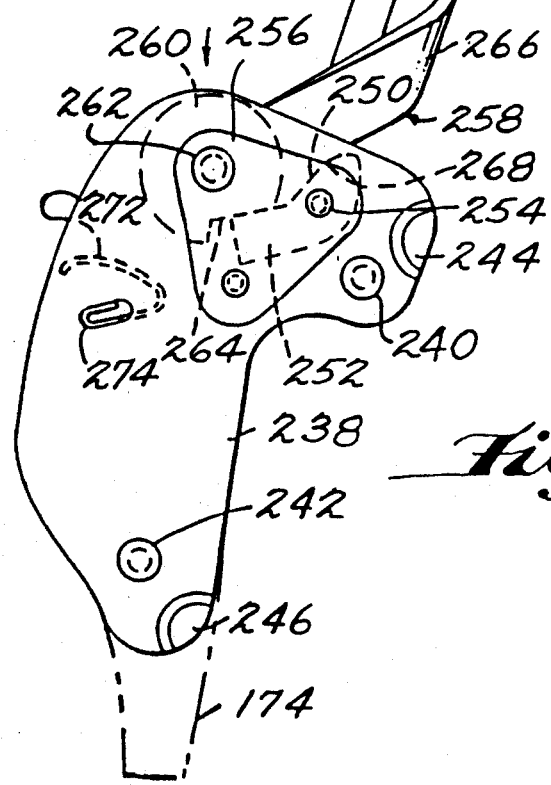
Figure 20:
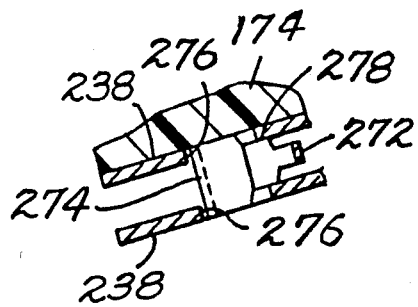
Figure 22:
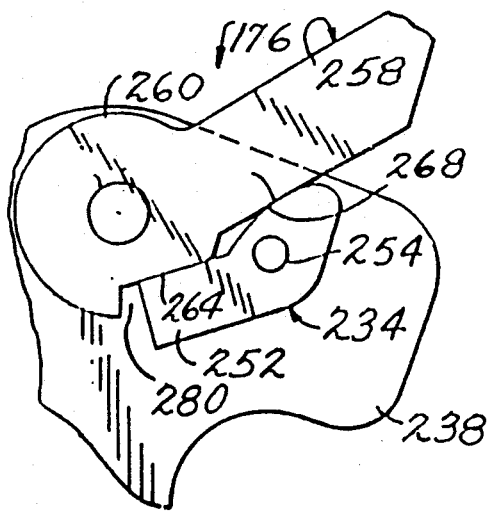
Figure 23:
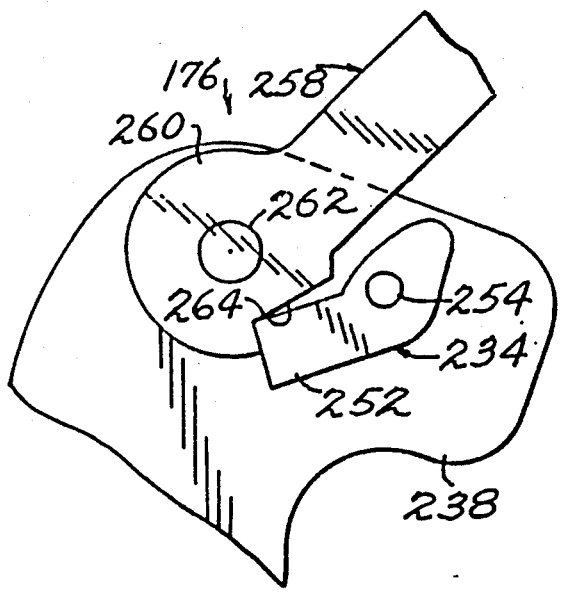

FIGS. 14 and 15 are enlarged fragmentary cross-sectional views taken along the respective lines 14—14 and 15—15 of 12;

FIG. 16 is a view similar to FIG. 12 illustrating the one latch mechanism in a second operational position;

FIG. 17 is a view similar to FIG. 13 of the latch mechanism shown in FIG. 14;

FIG. 18 is an enlarged side elevational view of a second latch mechanism for the child's seat module in one operational position;

FIGS. 19 and 20 are enlarged fragmentary cross-sectional views taken along the respective lines 19—19 and 20—20 of FIG. 18;

FIG. 21 is a view similar to FIG. 18 illustrating the second latch mechanism in another operational position;

FIG. 22 is a view similar to FIG. 13 of the second latch mechanism shown in FIG. 21;

FIG. 23 is a view similar to FIG. 22 in a further operational position; and

Figure 24:
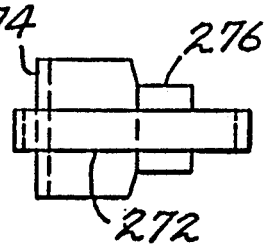
Figure 26:
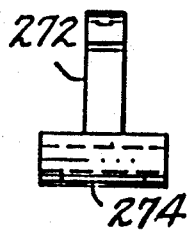
Figure 25:
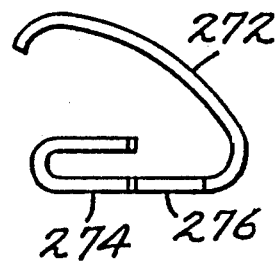

FIGS. 24–26 are enlarged top, side and end views, respectively, of one component of the latch mechanism.

Referring now more particularly to the drawings, there is shown in FIGS. 1–4 thereof a three-mode seat, generally indicated at 10, embodying the principles of the present invention, the seat 10 being shown mounted on the floor 12 of a motor vehicle 14 in a position to cooperate with an adult seat belt assembly, generally indicated at 16, of the vehicle 14. The seat 10 shown is a two occupant bench seat of the type installed in the middle of a van type motor vehicle having a side entrance door (not shown) near the side of the seat, as shown. In the embodiment shown, the adult seat belt assembly 16 is carried by the left side of the vehicle 14 for cooperating with an occupant seated on the left operative position of the bench seat 10. As shown, the left operative position of the bench seat is provided with a child's seat module, generally indicated at 18, embodying the principles of the present invention. It will be understood that an additional, similar child's seat module 18 may also be provided in the right-hand operative position of the bench seat 10.

The child's seat module 18 of the present invention is suitable to be fixed to the seat back frame of any vehicle seat, including single, tandem, or three-occupant bench seats with fixed or movable seat backs. The two-occupant bench seat 10 shown is considered to be particularly desirable since it is a seat, which by virtue of the type of motor vehicle involved, will often be occupied by one or more children.

The two-occupant bench seat 10 presents particular requirements because of the relatively low back construction provided in conventional bench seats of this type heretofore utilized, when compared, for example, to the seat back in the back of a sedan type motor vehicle. It will be understood that many of the principles of the present invention are applicable to the higher back rear seats in sedan motor vehicles while some are applicable only to a low back seat, such as shown. For example, the child's seat module 18 of the present invention provides a child's head rest by a movable part of the cushion assembly whereas with an initial higher back construction the child's head rest may be provided by a non-movable part of the cushion assembly.

Figure 4:
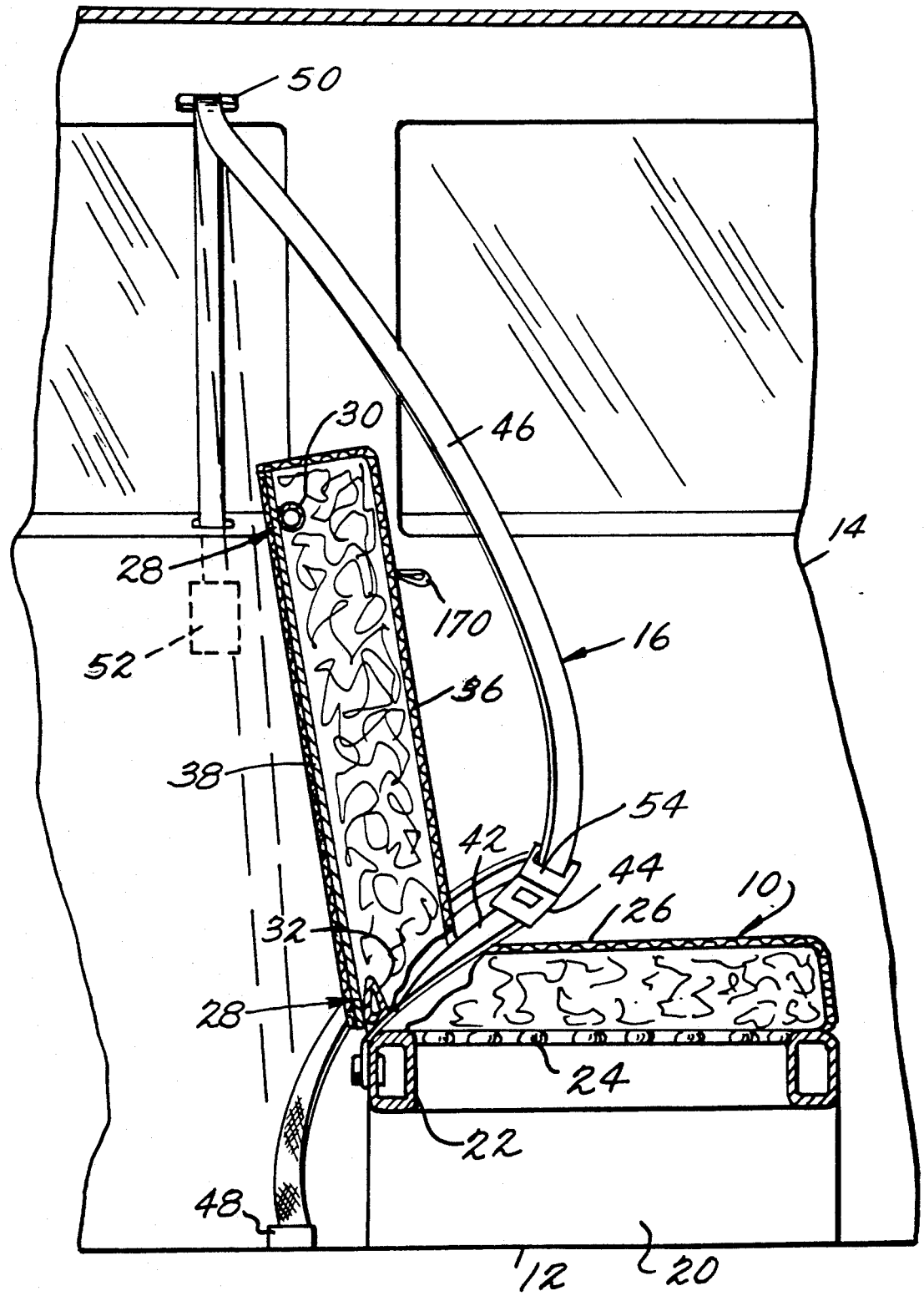
FIG. 4 is a vertical sectional view through the mid portion of the seat showing the cooperating connections of the adult seat belt assembly.

Referring now more particularly to FIG. 4, it will be noted that the two occupant bench seat 10 includes a pair of spaced risers 20 of conventional construction including lever actuated gripper assemblies (now shown) for releasably gripping floor cleats (not shown) so as to enable the seat 10 to be readily removed. Fixed to the upper ends of the risers 20 is a main seat frame 22 likewise of conventional construction. The main seat frame 22 is shown somewhat schematically in FIG. 4 as being a tubular rectangular peripheral structure having suitable springs 24 suspended in the open central position on which is supported a covered seat cushion 26 of conventional construction. As shown, the width of the seat cushion 26 is sufficient to enable two adult seat occupants to sit thereon in side-by-side operative positions.

The seat 10 also is provided with a seat back frame, generally indicated at 28, which also is preferably of conventional configuration. As shown, the seat back frame 28 includes a main inverted U-shaped frame member 30 positioned so that the lower free ends of the leg positions are rigidly fixed to the rearward sides of the main seat frame 22 and the central bight portion extends along the upper extent of the seat back. A lower tubular horizontal frame member 32 is welded or otherwise fixed between the leg positions of the main U-shaped frame member 30. Instead of the usual continuous cushioned sleeve which is extended over the seat back frame to form the seat back, the seat back is modified to accept the child's seat module 18. The description to follow will indicate the modifications necessary to install one child's seat module 18 in the left-hand operative position of the bench seat 10. It will be understood that the right-hand operative position can be similarly modified to install a second child's seat module 18 therein, if desired.

Referring to FIGS. 1-3, the modification required is to replace the normal seat back cushion mounted forwardly of the seat back frame 28 with a pair of side cushions 34 and 36 spaced apart a distance sufficient to fit a child therebetween. The side cushion 34 and 36 fixed forwardly of the frame 28 are suitably covered. A conventional backing 38 is provided rearwardly of the frame 28. The spacing between the side cushions 34 and 36 defines a space 40 between the side cushions 34 and 36 forwardly of the seat back frame 28 sufficient to receive a child therebetween and within which to mount the child's seat module 18.

Referring now to FIG. 4, it will be noted that the adult seat belt assembly 16 is mounted within the motor vehicle 14 in a position to cooperate with a seat occupant sitting on the left-hand operational position of the seat cushion 26. The adult seat assembly 16 can assume different configurations, however, as shown, the assembly 16 includes a belt section 42 fixed to the rearward central position of the main seat frame 22 and extending therefrom forward between the seat cushion 26 and the seat back side cushion 36. The belt section 42 carries a releasable buckle assembly 44 of conventional construction at its opposite end.

A main belt section 46 is anchored at one end to the floor, as indicated at 48, and extends therefrom over a fixed guide 50 mounted on the left side of the vehicle near the roof. From the fixed guide 50, the belt section 46 extends downwardly to a take up reel assembly 52 of conventional construction suitably mounted in the left side of the vehicle 14.

As best shown in FIG. 4, the extent of the belt section 46 extending from the floor anchor 48 to the roof guide 50 has a clip element 54 slidable thereon capable of being releasably engaged by the buckle assembly 44.

In accordance with usual procedure, an adult occupant in the left operative position on the seat cushion 26 is able to move the seat belt assembly 16 into operative relation by grasping the clip element 54 and bringing it across that seat occupant's chest into engaged relation to the buckle assembly 44. In this way, a lower extent of the belt section 46 between the floor anchor 48 and the clip element 54 extends over the seat occupant's waist and an upper extent of the belt section 46 between the clip element 54 and the fixed guide 50 extends across the left shoulder of the seat occupant.

Figure 5:
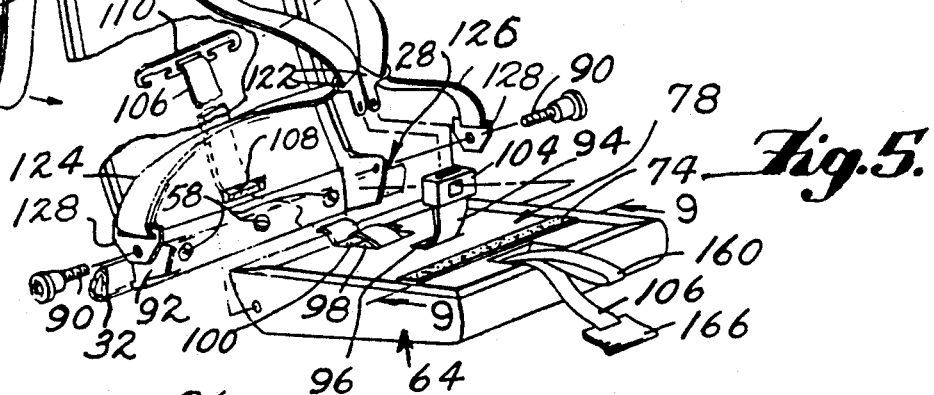
FIG. 5 is an exploded perspective view of a child's seat module embodying the principles of the present invention with the child's cushion pad removed to more clearly show the connection of the back panel of the module to the cross members of the seat back frame.

Referring now more particularly to FIG. 5, the child's seat module 18 is shown therein in exploded perspective so as to indicate the manner in which it is mounted on the seat back frame 28 between the side cushions 34 and 36. As shown, the module 18 includes a rigid structure, which in the broadest aspects of the present invention, may be regarded as part of the seat back frame. The rigid structure is in the form of a back panel 56 of rigid material, as, for example, a suitable moldable plastic material. As shown, the rearward surface of the back panel 56 is shaped to engage the forward portion of the frame member 30 extending horizontally across the upper rearward portion of the space 40 between the side cushions 34 and 36 and the forward portion of the lower frame member 32 extending horizontally across the lower rearward portion of the space 40. The back panel 56 is rigidly attached or affixed to the frame members 30 and 32 by suitable fasteners, as indicated at 58.

The child's seat module 18 also includes a cushion assembly, generally indicated at 60, carried by and connected with the back panel 56 and a child's seat belt assembly, generally indicated at 62, also carried by and connected with the back panel 56. In the preferred embodiment shown, the cushion assembly 60 includes a lower movable seat cushion assembly or unit, generally indicated at 64, an upper movable head cushion assembly or unit, generally indicated at 66, and a cushion pad, generally indicated at 68, now shown in FIG. 5, see FIG. 2. The movable cushion assemblies 64 and 66 of the child's seat module 18 are movable between (1) an adult mode position wherein the movable cushion assemblies 64 and 66 are disposed within the space 40 between the side cushions 34 and 36 and provide cushion means for engagement by the center of the back of an adult seat occupant sitting on the seat cushion 26 in the left hand operative position and (2) a child's mode position wherein the movable cushion assemblies 64 and 66 extend from the space 40. In the adult mode position, the movable cushion assemblies 64 and 66 have an appearance like that shown in FIGS. 1-3 in the seat back above the right-hand operative position. The child's mode position of the movable cushion assemblies 64 and 66 is shown in FIGS. 1-3 and it will be noted that the lower seat cushion assembly 64 extends from the bottom of the space 40 in overlying relation to the seat cushion 26 so as to provide, with a seat portion 70 of the cushion pad 68 detachably mounted thereon, a cushioned child's seat. A back portion 72 of the cushion pad 68 extends upwardly from the rearward end of the seat portion 70 and is detachably secured to the back panel 56 to provide a cushioned child seat back. The upper movable head cushion assembly 66 provides a cushioned child's head support above the cushioned child's seat back.

When a small child (e.g. between 20 and 40 pounds) is sitting on the cushioned child's seat with the child's back and head engaged against the cushioned child's back and head support, the child's seat belt assembly 62 of the module 18 is used as a restraint for the small child in the child's seat module 18. This relationship is shown in FIG. 1. The child's seat belt assembly 62 is movable into a child's booster seat position. FIG. 2 illustrates a step in accomplishing this movement. As shown therein, the cushion pad 68 is detachably mounted with respect to the lower seat cushion assembly 64 and the back panel 56. Any suitable means may be used to accomplish this detachable mounting. An exemplary embodiment is to utilize VELCRO strips 74 as shown in FIG. 5 on the back panel 56 and lower seat cushion assembly 64 and registering cooperative VELCRO strips 76 on the back of the cushion pad as shown in dotted lines in FIG. 2.

The child's seat belt assembly 62 is moved into the booster seat position by detaching the cushion pad 68, as shown in FIG. 2, and replacing it so that the child's seat belt assembly 62 is disposed rearwardly and beneath the cushion pad 68. In this way, the child's seat belt assembly 62 remains with the module 18 for use simply by detaching the cushion pad 68, deploying the child's seat belt assembly 62 and then replacing the cushion pad 68.

Referring now more particularly to FIG. 3, this Figure illustrates a larger child (e.g. above 40 pounds) sitting on the cushioned child's seat with the child's back and head engaging the cushioned child's back and head support of the module 18 when the child's seat belt assembly 62 is in its booster seat position. As shown, the module 18 acts as a booster seat for the larger child enabling the larger child to more conveniently see out of the vehicle windows and to more conveniently effect restraint by simply using the adult seat belt assembly 16, as is clearly shown in FIG. 3.

Figure 8:
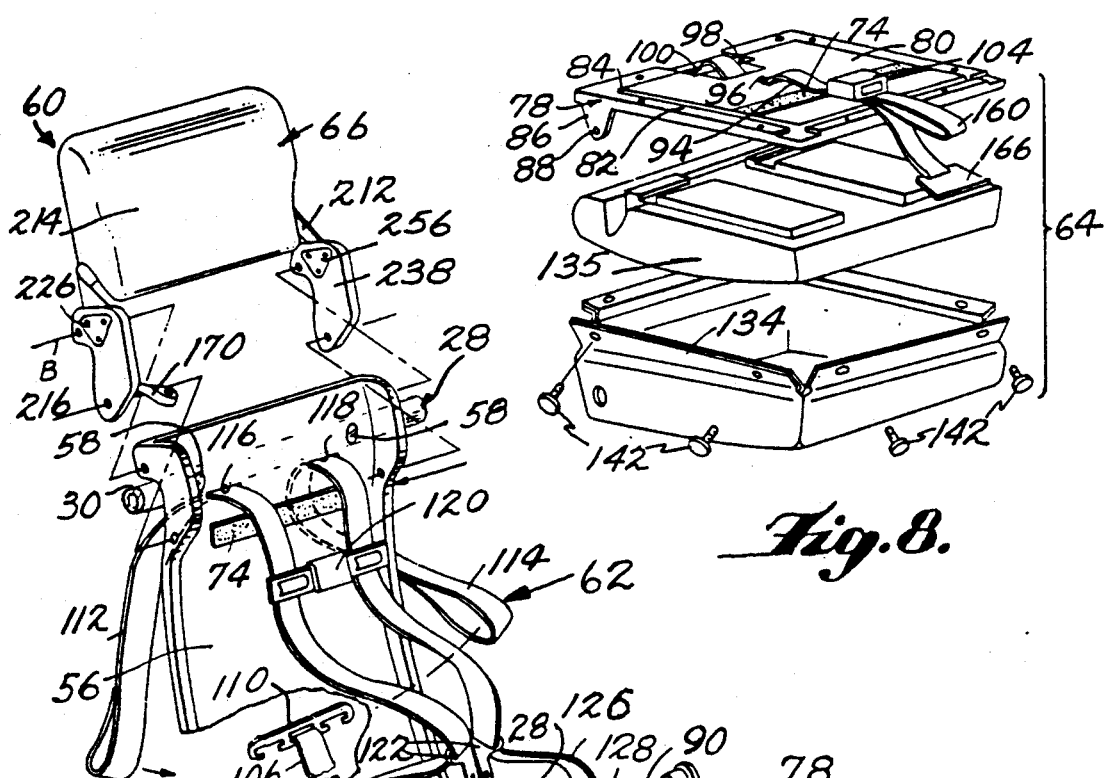
FIG. 8 is a fragmentary, exploded perspective view of the lower movable cushion assembly of the module.

Referring now more particularly to FIGS. 5–11, the specific construction of the movable seat cushion assembly 64 and the specific construction of the child's seat belt assembly 62 and the manner in which the seat belt assembly 62 cooperates with the movable seat cushion assembly 64 and the back panel 56, will now be described. As best shown in FIG. 8, the lower seat cushion assembly 64 includes a rigid structure, generally indicated at 78 in the form of a rectangular seat pad support platform molded of suitable structural plastic material. As best seen in FIG. 9, the rigid structure 78 has a central planar portion 80 bordered by a peripheral downwardly offset frame-like ledge portion 82 extending therearound. A trough or slot 84 is formed in the top surface of the rigid structure located a predetermined distance inside the outer perimeter thereof, providing a continuous boundary between the central portion 80 and the ledge portion 82, for a purpose to be described.

Figure 6:
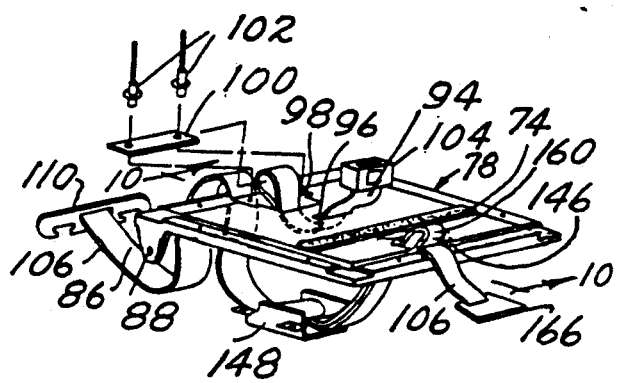
FIG. 6 is an exploded, perspective view of a portion of the lower movable cushion assembly of the child's seat module together with a portion of the five point safety harness constituting the child's seat belt assembly.

As best shown in FIGS. 6, 8 and 10, a pair of perpendicularly extending mounting flanges 86 are formed adjacent the rear corners of the rigid structure 78 with axially aligned openings 88 formed therein. The openings 88 are adapted to having suitable fasteners 90 (FIG. 10) extended therethrough to pivotally secure the rigid structure 78 to suitable mounting brackets 92 (FIG. 12) fixedly secured to extend from the module back panel 56.

A crotch belt section 94 extends longitudinally beneath the rigid structure 78, and thence upwardly through central and rear openings 96 and 98, respectively, formed therein, to be secured at the rear end thereof by a suitable mounting bracket or plate 100. The bracket 100 is secured to the rigid structure 78 by suitable fasteners 102 (FIG. 6). A conventional seat restraint belt buckle assembly 104 is secured to the exposed forward end of the crotch belt section 94.

As shown in FIG. 5, a single seat belt 106 extends through a slotted lower opening 108 formed adjacent the bottom of the back panel 56 and is connected to a child safety restraint harness including a dividing bracket 110 and a pair of twin shoulder belts 112 and 114 extending through respective openings 116 and 118 in the back panel 56 and thence through a releasably interconnected guide member 120 and slotted ends of a pair of opposite hand connector members 122. The latter are adapted to be releasably connected to the buckle assembly 104. Extensions 124 and 126 of the respective belts 112 and 114 are each secured at one end thereof by brackets 128 to the mounting flanges 86 through mounting brackets 92. The extensions 124 and 126 serve to mount over the child's thighs.

The cushion pad 68 has the seat and back portions 70 and 72 connected by a flexible hinge 130 and a rectangular cut-out opening 132 is formed in the seat portion 70 for mounting around the crotch belt 94 out of the rigid structure 78. The upper edge of the back portion 72 fits against the back panel 56 up to a point just below the openings 116 and 118.

As shown in FIG. 9, an outer cloth or other "fabric" surface material, such as vinyl or leather, cover 134 is wrapped around a foam cushion 135 of the cushion assembly 64. A plurality of spaced holes 136 are formed in the rigid structure 78 intermediate the trough 84 and the edges of the ledge portion 82. An L-shaped retainer assembly comprising a flat retainer leg 138 and a right-angle foot flange 140 formed on the inner edge thereof, and suitable fasteners 142, such as pine-tree type push-in plastic fasteners, extend through openings 144 formed at spaced intervals along the center line of the retainer leg 138, and thence through the cover 134 into the cushion 135. The fasteners 142 are aligned with, and snap into, the ledge portion holes 136. The cover 134 is wrapped around the flange 140 and retained thereby when projected into the trough 84, as shown at the left side of FIG. 9.

As shown in FIGS. 5–11, the twin shoulder belts 112 and 114 connect through the dividing bracket 110 (FIG. 6) to the belt 106. The latter extends beneath the rigid structure 78 and through a front opening 146 and the rear opening 98. It passes through a flat bracket 148 (FIGS. 6 and 11) prior to exiting through the front opening 146 (FIGS. 6 and 10), wherein it may be retained in position by a serrated surface 150 (FIG. 10), serving as a tension adjuster on a cross member 152 which is pivotally mounted on a pin 154 (FIG. 11) between oppositely disposed side walls 156 of the bracket 148. A coil spring 158 operatively connected between the cross member 152 and the pin 154 retains the serrated surface 150 in a gripping engagement against the belt 106 until a shoulder adjustment pull strap 160 extending through the front opening 146 is pulled forward to pivot the cross member 152 and thereby release the single seat belt 106 and permit it to be pulled to tighten the shoulder belts 112 and 114 around the child. The pull strap 160 is mounted around a bar 162 connected to forward edges of the cross member 152 by levers 164. A belt tab 166 (FIG. 6) is secured at the end of the belt 106 to facilitate the pulling-to-tighten process.

Referring now more particularly to FIGS. 12–17, there is shown therein a fold-up head support latch mechanism 168 which is preferably provided in accordance with the principles of the present invention to interconnect the upper movable head cushion assembly 66 to the back panel 56. The latch mechanism 168 is adapted to be activated in a manner hereinafter to be more fully described by a nylon pull strap 170 which is adapted to extend forward in an exposed access position when the upper cushion assembly 66 is in its adult mode position.

As best shown in FIG. 5, the upper end of the back panel is formed with flanges 172 and 174 at opposite sides and the fold-up head support latch mechanism 168 is mounted on one flange 172, while a further head support latch mechanism 176 of a different type, as will be explained, is mounted on the other flange 174.

As shown in FIG. 12, the disengaging nylon pull strap 170 is connected to a hook or loop 178 which is formed on the lower end of a first latch 180. The latch 180 is pivotally mounted at central portion 182 thereof on a fixed rivet 184 defining a pivot axis. The latch 180 may be referred to as having a substantially "sea horse" shape, in that the upper body portion 186 thereof, above the rivet 184, includes a head 188 having a nose projection 190 formed thereon, for a purpose to be described. The lower body portion 192 has a spring mounting hole 194 formed therein a predetermined spaced distance from the rivet 184.

A head support latch cam 196 includes a round body segment 198 rotatably mounted on a fixed rivet 200 defining a pivot axis. A pair of oppositely disposed notches 202 and 204 are formed in the periphery of the round body segment 198, with a contoured leg segment 206 including a surface 208 aligned with a side of the notch 204 and extending therefrom substantially radially outward from the body segment 198 adjacent the notch 204. An end portion 210 of the leg segment 206 is secured in any suitable manner; such as by welding, to one side of a rigid structure 212 forming an interior part of the cushion assembly 64 the exterior of which is formed by covered cushions 214 (see FIG. 5). As shown in FIG. 12, the nose projection 190 of the latch 180 is adapted to mount in the notch 202 when the rigid structure 212 is down.

Figure 7:
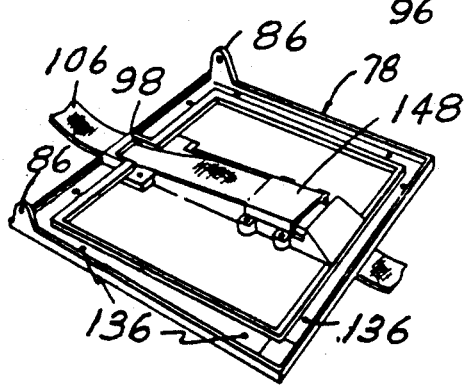
FIG. 7 is a perspective view of the underside of the rigid structure shown in FIG. 6.

Each of the rivets 184 and 200 is mounted through two spaced apart hinge plates 216, such that the latch 180 and the latch cam 196 are rotatable intermediate the two hinge plates 216. The latter are spaced apart by a pair of bosses 218 and 220 (FIGS. 4, 6 and 7). A pair of shoulder bolts 222 and 224 serve to secure the hinge plates 216 to the side flange 172.

A triangular shaped boss 226 is formed on each hinge plate 216, for the mounting therethrough of the rivets 184 and 200. A notch 228 is formed on an edge of one of the hinge plates 216's. A coil spring 230 is mounted between the notch 228 and the mounting hole 194 formed in the latch 180, serving to urge the nose projection 190 into the notch 202 of the latch cam 206, as seen in FIGS. 12 and 13.

When it is desired to bring the upper cushion assembly 66 into its child mode position, the nylon pull strap 170 is pulled outwardly. This acts on the loop 178 of the latch 180 against the force of the spring 230 to pivot the latch 180 about the rivet 184 in a clockwise direction, as related to FIG. 12, thereby releasing the nose projection 190 from the notch 202 of the latch cam 196. This permits the manual opening up of the upper cushion assembly 66 about its pivot axis, until the nose projection 190 enters the notch 204, upon the release of the pull strap 170, as shown in FIGS. 16 and 17.

As may be noted more particularly in FIGS. 13 and 17, there is a stepped relationship between the top surfaces of the nose projection 190 and the head 188 of the latch 180. Specifically, for the most effective interconnection between the top surface of the nose projection 140 and the abutting surface of the notch 202, the mating line is preferably at an angle A on the order of 20 degrees below horizontal outward of the round body segment 198, as shown in FIG. 13 at approximately the center of the contacting surfaces, when the head cushion assembly 66 is in its adult mode position. As illustrated in FIG. 17, for the most effective interconnection between the top surface of the head 188 and the abutting surface 208 of the latch cam leg segment 206, with the nose projection 190 in the notch 204, the wedge angle defined by angle B is preferably at an angle on the order of 15 degrees for a "no-chuck" or no-play condition when the head cushion assembly 66 is in its child mode position. The mating surface shown as 232 is preferably at an angle C of between 90 and 97 degrees relative to two lines drawn from pivot centers 184 and 200 intersecting at substantially the midpoint of the mating surface 232.

Referring now to FIGS. 18–23, the head support latch mechanism 176 includes a, so-called, inertia latch 234 pivotally mounted directly above a center of gravity portion thereof on a fixed rivet 236, on the side flange 174, between a pair of hinge plates 238 comparable to the hinge plates 216. The hinge plates 238 are secured to the side flange 174 by a pair of shoulder bolts 240 and 242, and are accurately spaced apart by bosses 244 and 246.

The inertia latch 234 includes a body segment 248 having an arcuate-shaped edge 250 formed on an upper side thereof, with a latching finger 252 formed adjacent the other end of the arcuate-shaped edge 250. The inertia latch is pivotal about a rivet 254 between the hinge plates 238, within the confines of oppositely disposed bosses 256 formed on the hinge plates 238.

A second head support latch cam 258 includes a round body segment 260 secured at its center by a fixed rivet 262 on the side flange 174 opposite the head support latch cam 196. A step 264 is formed in an upper portion of the periphery of the round body segment 260, with a leg segment 266 extending substantially radially outward from the body segment adjacent the step 264. A contact surface 268 is formed on the upper side of the leg segment 266. An outermost portion 270 of the leg segment 266 is secured in any suitable manner, such as by welding, to the adjacent side of the rigid structure 212, opposite the head support latch cam 196.

In its adult mode position, the latch cam 258 is retained in position by having compressed a substantially arcuate-shaped leaf spring 272 extending from a fixed base 274 having oppositely disposed ends thereof mounted in openings 276 formed in the respective hinge plates 238. A connector portion 278 of the leaf spring 272 with the base 274 is of a width which serves as a guide for the leaf spring between the hinge plates 238 (FIG. 20). The details of the spring assembly is shown in FIGS. 24–26).

When it is desired to bring the head cushion assembly 66 into its child mode position, and the nylon pull strap 170 is pulled outwardly, as discussed above relative to the latch 180 (FIGS. 12 and 13), releasing the nose projection 190 from the notch 202 of the latch cam 196, the previously compressed leaf spring 272 serves to project the leg segment 266 and, hence, the rigid structure 212 of the head cushion assembly 66 outwardly, into substantially the position shown by phantom lines in FIG. 18, ready to be rotated into the upright position shown in FIGS. 16 and 21.

Referring now to FIGS. 21 and 22, it may be noted that, as the head cushion assembly 66 is being raised in a clockwise direction, the contact surface 268 of the second head support latch cam 258 engages the arcuate-shaped edge 250, causing the latching finger 252 to enter the step 264. It is noted in FIG. 22 that a space 280 exists between the end of the latching finger 252 and the bottom of the step 264, while the head cushion assembly 66 is in the child mode position. In the event a quick stop occurs, i.e., a forward deceleration exceeding substantially 0.75 times the force of gravity, the head cushion assembly 66 and, hence, the head support latch cam may rotate forward, through the space 280, as shown in FIG. 23, with the end of the latching finger 252 contacting the bottom of the step 264, thus assuring that the head cushion assembly 66 will remain in its child mode position.

It thus will be seen that the objects of this invention have been fully and effectively accomplished. It will be realized, however, that the foregoing preferred specific embodiment has been shown and described for the purpose of this invention and is subject to change without departure from such principles. Therefore, this invention includes all modifications encompassed within the spirit and scope of the following claims.

What is claimed is:

1. A three-mode seat for a motor vehicle providing three modes of operation including an adult seat mode, a large child booster seat mode, and a small child mode, said three-mode seat comprising a seat frame assembly for securement within the motor vehicle including a seat cushion frame and a seat back frame mounted with respect to said seat cushion frame in an operative fixed relation, a cushion assembly mounted on said seat frame assembly to provide a seat and seat back (1) for accommodating an adult in said adult seat mode, (2) a large child in said booster seat mode, and (3) a small child in said small child mode, said cushion assembly including a movable cushion assembly mounted on said seat frame assembly for movement between (1) an adult mode position wherein cushion assembly including said movable cushion assembly provides an adult seat cushion disposed in an operative position with respect to said seat cushion frame and a cushioned adult seat back for engaging the back of an adult sitting on said adult seat cushion. (2) a small child mode position wherein said cushion assembly including said movable cushion assembly provides a cushioned small child's seat disposed in a position above the operative position of said adult seat cushion for engaging a small child sitting thereon, a cushioned small child's seat back extending upwardly from said cushioned small child's seat for engaging a small child's back sitting on said cushioned small child's seat and a cushioned small child's head rest extending above said cushioned small child's seat back for engaging a small child's head sitting on said cushioned small child seat, and (3) a booster seat mode position wherein said cushion assembly including said movable cushion assembly provides a cushioned large child's seat disposed in a position above the operative position of said adult seat cushion for engaging a large child sitting thereon and a cushioned large child's seat back for engaging the back of a large child sitting on said cushioned large child's seat.

an adult seat belt assembly mounted with respect to said three-mode seat within the motor vehicle for movement between a released inoperative position and a locked operative position wherein said adult seat belt assembly (1) extends in restraining relation over a shoulder and the lap of an adult sitting on said adult seat cushion with said movable cushion assembly in said adult mode position and (2) extends in restraining relation over a shoulder and the lap of a large child sitting on said cushioned large child's seat with said movable cushion assembly in said booster seat mode position, and a small child's seat belt assembly connected with said seat back frame and extending forwardly of said cushioned child's seat back for extension over the shoulders of a small child sitting on the cushioned child's seat with said movable cushion assembly in said small child's mode position, said cushioned small child's seat providing an anchor point for the small child's seat belt assembly between the legs of a small child sitting on said cushioned small child's seat, said cushion assembly including a pair of side cushions fixedly carried by said rigid seat back frame so as to define a space therebetween, said movable cushion assembly when in said adult mode position effectively filling said space, said seat back frame including vertically spaced horizontally extending frame members extending across a rearward extend of the space between said side cushions, said seat back frame also including a rigid back panel on which said cushion assembly and said child's seat belt assembly are mounted to form with said back panel a child seat module operable to be mounted on said frame members between said side cushions, said back panel and hence said child seat module being fixedly secured to said frame members forwardly thereof with said back panel extending vertically between said side cushions, said movable cushion assembly including rigid structure connected with said back panel for mounting said movable cushion assembly for movement between said adult mode and child mode positions, a movable seat cushion unit and a movable head cushion unit, said rigid structure including a rigid seat structure forming a part of said movable seat cushion unit, and a rigid head structure forming a part of said movable head cushion unit, said rigid seat structure being pivotally connected with said back panel for pivotal movement about a generally horizontally extending axis so that (1) in said adult mode position said movable seat cushion unit extends within a lower end portion of said space and (2) in said child mode position said movable seat cushion unit extends forwardly from the lower end portion of the space in supported relation on said seat cushion assembly, said rigid head structure being pivotally connected with said back panel for pivotal movement about a generally horizontally extending axis so that (1) in said adult mode position said movable head cushion unit extends within said space between upper end portions of said side cushions and (2) in said child mode position said movable head cushion unit extends upwardly from said space above the upper end portions of said side cushions and provides the cushioned child's head support.

2. A three-mode seat as define din claim 1 wherein said cushion assembly includes a cushion pad detachably mounted on said back panel in a position to provide said cushioned child's seat back and extending forwardly over said movable seat cushion unit to provide therewith said cushioned child's seat.

3. A three-mode seat as defined in claim 2 wherein said small child's seat belt assembly is disposed rearwardly and below said cushion pad when in said child's booster seat position.

4. A three-mode seat for a motor vehicle cooperable with an adult seat belt assembly to provide three modes of operation including an adult seat mode, a large child booster seat mode, and a small child mode, said three-mode seat comprising a rigid frame assembly for securement within the motor vehicle interior, a seat cushion carried by said rigid frame assembly in a position to enable an adult occupant of the motor vehicle to sit thereon in an operative position to secure the adult seat belt assembly in operative relation over the adult occupant's shoulder and waist, a rigid seat back frame assembly mounted with respect to said rigid frame assembly in an operative fixed relation, side cushions carried by said seat back frame assembly in positions to be engaged by opposite sides of the back of an adult seat occupant sitting on said seat cushion in said operative position, said side cushions being spaced apart a distance sufficient to define a child receiving space therebetween of a size to enable a child to be disposed therebetween, a cushion assembly mounted on said seat back frame assembly including a movable cushion assembly mounted on said seat back frame assembly for movement between (1) an adult mode position wherein said movable cushion assembly is disposed within the space between said side cushions and provides therewith a cushioned adult seat back for engaging the back of an adult seat occupant sitting on said seat cushion in said operative position, and (2) a child mode position wherein said movable cushion assembly extends from the space between said side cushions and said cushion assembly provides a cushioned child's seat extending from the bottom of the space in overlying relation to said seat cushion, a cushioned child's seat back extending upwardly from said cushioned child's seat within the space between said side cushions, and a cushioned child's head support above the cushioned child's seat back, a small child's seat belt assembly connected with said seat back frame assembly and extending forwardly of said cushioned child's seat back for extension over the shoulders of a small child sitting on the cushioned child's seat.

said cushioned child's seat providing an anchor point for the small child's seat belt assembly between the legs of a small child sitting on said cushioned child's seat, said small child's seat belt assembly being disposed within said space when said movable cushion assembly is in said adult mode position and being movable into a child's booster seat position when said movable cushion assembly is in said child mode position enabling the cushioned child's seat, the cushioned child's seat back and the cushioned child head rest to act as a booster seat for a large child capable of being retained therein by the adult seat belt assembly extending in operative relation with the large child's shoulder and waist, said seat back frame assembly including a seat back frame including vertically spaced horizontally extending frame members extending across a rearward extent of the space between said side cushions, said seat back frame assembly also including a rigid back panel on which said cushion assembly and said child's seat belt assembly are mounted to form with said back panel a child seat module operable to be mounted on said frame members between said side cushions for fixedly securing said back panel and hence said child seat module to said frame members forwardly thereof with said back panel extending vertically therebetween, said movable cushion assembly including rigid structure connected with said back panel for mounting said movable cushion assembly for movement between said adult mode and child mode positions, a movable seat cushion unit and a movable head cushion unit, said movable cushion assembly includes a movable seat cushion unit, said rigid structure including a rigid seat structure forming a part of said movable seat cushion unit pivotally connected with said back panel for pivotal movement about a generally horizontally extending axis so that (1) in said adult mode position said movable seat cushion unit extends within a lower end portion of said space and (2) in said child mode position said movable seat cushion unit extends forwardly from the lower end portion of the space in supported relation on said seat cushion, said rigid structure also including a rigid head structure forming a part of said movable head cushion unit pivotally connected with said back panel for pivotal movement about a generally horizontally extending axis so that (1) in said adult mode position said movable head cushion unit extends within said space between upper end portions of said side cushions and (2) in said child mode position said movable head cushion unit extends upwardly from said space above the upper end portions of said side cushions and provides the cushioned child's head support.

5. A three-mode seat as defined in claim 4 wherein said cushion assembly includes a cushion pad detachably mounted on said back panel in a position to provide said cushioned child's seat back and extending forwardly over said movable seat cushion unit to provide therewith said cushioned child's seat.

6. A three-mode seat as defined in claim 5 wherein said small child's seat belt assembly is disposed rearwardly and below said cushion pad when in said child's booster seat position.

7. A three-mode seat for a motor vehicle cooperable with an adult seat belt assembly to provide three modes of operation including an adult seat mode, a large child booster seat mode, and a small child mode, said three-mode seat comprising provides adult back cushion means for engaging the middle of the back of an adult seat occupant sitting on said seat cushion in said operative position, and (2) a child mode position wherein said movable cushion assembly means extends from the space between said side cushions and said cushion assembly means provides a cushioned child's seat extending from the bottom of the space in overlying relation to said seat cushion, a cushioned child's seat back extending upwardly from said cushioned child's seat within the space between said side cushions, and a cushioned child's head support above the cushioned child's seat back, a small child's seat belt assembly connected with said seat back frame means and extending forwardly of said cushioned child's seat back for extension over the shoulders of a small child sitting on the cushioned child's seat, said cushioned child's seat providing a rigid anchor point for the small child's seat belt assembly between the legs of a small child sitting on said cushioned child's seat, said small child's seat belt assembly being disposed within said space when said movable cushion assembly means is in said adult mode position and being movable into a child's booster seat position when said movable cushion assembly means is in said child mode position enabling the cushioned child's seat, the rigid frame means for securement within the motor vehicle interior, a seat cushion carried by said rigid frame means in a position to enable an adult occupant of the motor vehicle to sit thereon in an operative position to secure the adult seat belt assembly in operative relation over the adult occupant's shoulder and waist, rigid seat back frame means and means for mounting said rigid seat back frame means with respect to said rigid frame means in an operative fixed relation, side cushions carried by said seat back frame means in positions to be engaged by opposite sides of the back of an adult seat occupant sitting on said seat cushion in said operative position, said side cushions being spaced apart a distance sufficient to define a child receiving space therebetween of a size to enable a child to be disposed therebetween, cushion assembly means mounted on said seat back frame means including movable cushion assembly means and means for mounting said movable cushion assembly means for movement between (1) an adult mode position wherein said movable cushion assembly means is disposed within the space between said side cushions and cushioned child's seat back and the cushioned child head rest to act as a booster seat for a large child capable of being retained therein by the adult seat belt assembly extending in operative relation with the large child's shoulder and waist, said seat back frame means including a fixed skeletonized seat back frame to which said side cushions are secured, said fixed skeletonized seat back frame including vertically spaced horizontally extending frame members extending across a rearward extent of the space between said side cushions, said seat back frame means also including a rigid back panel on which said cushion assembly means and said child's seat belt assembly are mounted to form with said back panel a child seat module operable to be mounted on said frame members between said side cushions, means for fixedly securing said back panel and hence said child seat module to said frame members forwardly thereof with said back panel extending vertically therebetween, said movable cushion assembly means including rigid structure means, said mounting means for said movable cushion assembly means connecting said rigid structure means with said back panel for mounting said movable cushion assembly means for movement between said adult mode and child mode positions, said movable cushion assembly means including a movable seat cushion assembly, said rigid structure means further including a rigid seat structure forming a part of said movable seat cushion assembly, said mounting means for said movable cushion assembly means including means for pivotally connecting said rigid seat structure with said back panel for pivotal movement about a generally horizontally extending axis so that (1) in said adult mode position said movable seat cushion assembly extends within a lower end portion of said space and (2) in said child mode position said movable seat cushion assembly extends forwardly from the lower end portion of the space in supported relation on said seat cushion, said movable cushion assembly means including a movable head cushion assembly, said rigid structure means including a rigid head structure forming a part of said movable head cushion assembly, said mounting means for said movable cushion assembly means including means for pivotally connecting said rigid head structure with said back panel for pivotal movement about a generally horizontally extending axis so that (1) in said adult mode position said movable head cushion assembly extends within said space between upper end portions of said side cushions and (2) in said child mode position said moveable head cushion assembly extends upwardly from said space above the upper end portions of said side cushions and provides the cushioned child's head support.

8. A three-mode seat as defined in claim 7 wherein said cushion assembly means includes a cushion pad and means for detachably mounting said cushion pad on said back panel in a position to provide said cushioned child's seat back and extending forwardly over said movable seat cushion assembly to provide therewith said cushioned child's seat.

9. A three-mode seat as defined in claim 8 wherein said small child's seat belt assembly is disposed rearwardly and below said cushion pad when in said child's booster seat position.

10. A three-mode seat as defined in claim 9 wherein said seat is a bench seat wherein the seat cushion has a width which is generally only sufficient to enable a second adult to sit on the seat cushion in a second operative position alongside the adult seat occupant at the first-mentioned operative position.

11. A three-mode seat as defined in claim 10 wherein said means for pivotally connecting the rigid structure of said movable head cushion assembly with said back panel includes a latch mechanism for releasably retaining said movable head cushion assembly in said adult mode position and in said child mode position.

12. A three-mode seat as defined in claim 7 wherein said means for pivotally connecting the rigid head structure of said movable head cushion assembly with said back panel includes a latch mechanism for releasably retaining said movable head cushion assembly in said adult mode position and in said child mode position.

13. A three-mode seat as defined in claim 12 wherein said latch mechanism comprises a latch cam pivotally mounted at one side of said back panel and having a leg extension secured to a side of said head rigid structure and a pair of oppositely disposed notches formed thereon, latch means pivotally mounted on said one side of said back panel and having a nose projection formed thereon, spring means operatively connected to said latch means for urging said nose projection into one of said pair of oppositely disposed notches when said movable had cushion assembly is in said adult mode movable position, and into the other of said notches when said movable head cushion assembly is in said child mode position, and release means operatively connected to said latch means for manually releasing said nose projection from said respective notches against the force of said spring means to permit manual movement of said movable head cushion assembly from one of said positions to the other.

14. A three-mode seat as defined in claim 13 wherein said latch means is pivotally mounted on a rivet at an intermediate point along the length thereof, said nose projection is formed on one end thereof, and said spring means is operatively connected to the other end thereof.

15. A three-mode seat as defined in claim 13 wherein a pair of spaced apart hinge plates are secured to said one side of said back panel, and wherein each of said latch means and said latch cam are pivotally mounted intermediate said pair of spaced apart hinge plates.

16. A three-mode seat as defined in claim 13 wherein a second latch cam and cooperating inertia latch means are mounted at the other side of said back panel and operatively connected to said rigid head structure.

17. A three-mode seat as defined in claim 13 wherein the angular relationship of the upper side of said nose projection in engagement with said one of said oppositely disposed notches of said latch cam is on the order of 20° from horizontal.

18. A three-mode seat as defined in claim 13 wherein the angular relationship of the upper end of said latch means adjacent said nose projection in engagement with said latch cam adjacent the upper side of said other of said oppositely disposed notches of said latch cam is on the order of 15° with respect to a line drawn through the pivot point of said latch cam and along the lower engaged surfaces of said nose projection and said other of said oppositely disposed notches.

19. A three-mode seat as defined in claim 13 wherein the angular relationship between the lower side of said nose projection in engagement with said other of said oppositely disposed notches of said latch cam is between 90° and 97° as measured between a first line drawn along the lower engaged surfaces and through the pivot point of said latch cam and a second line drawn through the pivot point of said latch means and through the midpoint of said lower engaged surfaces.

20. A three-mode seat as defined in claim 12 wherein said latch mechanism comprises a first latch cam pivotally mounted at one side of said back panel and having a leg extension secured to a side of said head rigid structure and a pair of oppositely disposed notches formed thereon, latch means pivotally mounted on said one side of said back panel and having a nose projection formed thereon, spring means operatively connected to said latch means for urging said nose projection into one of said pair of oppositely disposed notches when said movable head cushion assembly is in said adult mode position and into the other of said notches when said movable head cushion assembly is in said child mode position, and release means operatively connected to said latch means for manually releasing said nose projection from said respective notches against the force of said spring means to permit manual movement of said movable head cushion assembly from one of said positions to the other; and a second latch cam mounted on the other side of said back panel, and inertia latch means mounted on said other side for cooperation with said second latch cam while said movable head cushion assembly is in said child mode position.

21. A three-mode seat as defined in claim 20 wherein said second latch cam includes a step formed on an outer periphery thereof, and a leg extension secured to the other side of said head rigid structure, and said cooperating inertia latch means is pivotally mounted above a center of gravity point thereon and an arcuate-shaped edge formed on an upper side thereof, said second latch cam being adapted to contact said arcuate-shaped edge and cause said latching finger to engage said step when said movable head cushion assembly is moved upwardly from said adult mode position.

22. A three-mode seat as defined in claim 20 wherein said back panel has a pair of spaced-apart hinge plates secured to the other side thereof and each of said second latch cam and said inertia latch means are pivotally mounted intermediate said pair of spaced apart hinge plates.

23. A three-mode seat as defined in claim 22 wherein said second spring means is operative between said pair of spaced-apart hinge plates and said second latch cam for projecting said second latch cam outwardly when said nose projection is manually released from said one of said pair of oppositely disposed notches.

24. A three-mode seat as defined in claim 22 wherein said second spring means is a substantially arcuate-shaped leaf spring having a base secured to said pair of hinge plates.

25. A three-mode seat for a motor vehicle cooperable with an adult seat belt assembly to provide three modes of operation including an adult seat mode, a large child booster seat mode, and a small child mode, said three-mode seat comprising rigid frame means for securement within the motor vehicle interior, a seat cushion carried by said rigid frame means in a position to enable an adult occupant of the motor vehicle to sit thereon in an operative position to secure the adult seat belt assembly in operative relation over the adult occupant's shoulder and waist, rigid seat back frame means and means for mounting said rigid seat back frame means with respect to said rigid frame means in an operative fixed relation, side cushions carried by said seat back frame means in positions to be engaged by opposite sides of the back of an adult seat occupant sitting on said seat cushion in said operative position, said side cushions being spaced apart a distance sufficient to define a child receiving space therebetween of a size to enable a child to be disposed therebetween, cushion assembly means mounted on said seat back frame means including movable cushion assembly means and means for mounting said movable cushion assembly means for movement between (1) an adult mode position wherein said movable cushion assembly means is disposed within the space between said side cushions and provides adult back cushion means for engaging the middle of the back of an adult seat occupant sitting on said seat cushion in said operative position, and (2) a child mode position wherein said movable cushion assembly means extends from the space between said side cushions and said cushion assembly means provides a cushioned child's seat extending from the bottom of the space in overlying relation to said seat cushion, a cushioned child's seat back extending upwardly from said cushioned child's seat within the space between said side cushions, and a cushioned child's head support above the cushioned child's seat back, a small child's seat belt assembly connected with said seat back frame means and extending forwardly of said cushioned child's seat back for extension over the shoulders of a small child sitting on the cushioned child's seat, said cushioned child's seat providing a rigid anchor point for the small child's seat belt assembly between the legs of a small child sitting on said cushioned child's seat, said small child's seat belt assembly being disposed within said space when said movable cushion assembly means is in said adult mode position and being movable into a child's booster seat position when said movable cushion assembly means is in said child mode position enabling the cushioned child's seat, the cushioned child's seat back and the cushioned child head rest to act as a booster seat for a large child capable of being retained therein by the adult seat belt assembly extending in operative relation with the large child's shoulder and waist, said seat back frame means including a fixed skeletonized seat back frame to which said side cushions are secured, said fixed skeletonized seat back frame including vertically spaced horizontally extending frame members extending across a rearward extent of the space between said side cushions, said seat back frame means also including a rigid back panel on which said cushion assembly means and said child's seat belt assembly is mounted to form with said back panel a child seat module operable to be mounted on said frame members between said side cushion means for fixedly securing said back panel and hence said child's seat module to said frame members forwardly thereof with said back panel extending vertically therebetween, said movable cushion assembly means including rigid structure means, said mounting means for said movable cushion assembly means connecting said rigid structure means with said back panel for mounting said movable cushion assembly means for movement between said adult mode and child mode positions, said movable cushion assembly means including a movable seat cushion assembly, said rigid structure means further including a rigid seat structure forming a part of said movable seat cushion assembly, said mounting means for said movable cushion assembly means including means for pivotally connecting said rigid seat structure with said back panel for pivotal movement about a generally horizontally extending axis so that (1) in said adult mode position said movable seat cushion assembly extends within a lower end portion of said space and (2) in said child mode position said movable seat cushion assembly extends forwardly from the lower end portion of the space in supported relation on said seat cushion, said rigid seat structure provides said rigid anchor point, said child's seat belt assembly comprising a crotch belt connected at one end thereof to the rigid seat structure to extend therefrom at said anchor point, a buckle connected to the distal end of said crotch belt, and a restraint harness including twin shoulder belts extending through openings formed in said back panel and having connectors operatively connected thereto for connection with said buckle, a dividing bracket for connecting the ends of said twin shoulder belts behind said back panel to a single seat belt extending through a lower opening adjacent the bottom of said back panel and thence through a rear opening in said rigid seat structure platform to extend beneath the latter to emerge through a front opening in said rigid seat structure, and tension adjuster means operatively connected to said single seat belt intermediate said front and rear openings, said tension adjuster means including actuator means extending to a position to be adjusted at a forward portion of said movable seat cushion assembly.

26. A three-mode seat as defined in claim 25 wherein said tension adjuster means includes a flat bracket having side walls thereon, a cross member pivotally mounted on a pin intermediate said side walls, said single belt being threaded intermediate the flat bracket and the cross member, a serrated surface formed on said cross member adjacent said single belt, spring means operatively connected between said cross member and said pin to retain said serrated surface in a gripping engagement with the single belt to retain same in a predetermined position, said actuator means including a pull strap connected to said cross member and extending through said front opening adapted to pivot said cross member and the serrated surface to release said single belt to permit manual adjustment thereof to selectively tighten the associated pair of shoulder belts around the child.

27. A three-mode seat as defined in claim 26 and extensions of said twin shoulder belts through said connector members serving as thigh belts and each said twin shoulder belt secured at one end thereof to respective rear corners of said seat rigid structure.

28. A three-mode seat as defined in claim 25 wherein said rigid seat structure includes a continuous through portion formed therein a predetermined distance from an outer peripheral edge thereof and defining a central portion; a first plurality of spaced-apart holes formed in a frame-like ledge portion intermediate said trough portion and said outer edge; a flat retainer mounted on said ledge portion, including a second plurality of holes aligned with said first plurality of holes and a flange formed on the inner edge of said flat retainer for mounting in said trough; a plurality of fasteners mounted through said aligned first and second pluralities of holes; said movable seat cushion assembly including a foam cushion and a cover wrapped around said foam cushion, said flat retainer, and said flange to said central portion so as to be retained in said trough by said flange.

29. A three-mode seat as defined in claim 28 wherein said ledge portion intermediate the trough and the outer edge is on a plane lower than the central portion defined by said continuous trough, such that the outer surface of said flat retainer and overlying cover is coplanar with said central portion.

30. A child's seat module for mounting on a seat back frame of a vehicle seat having a seat cushion and spaced apart side cushions on the seat back frame defining a child-receiving space therebetween, said child's seat module comprising a rigid back panel of a size to fit within the space between the side cushions having means for engaging with the seat back frame forwardly thereof within a rearward portion of the space between the side cushions for fixed securement thereto, cushion assembly means mounted on said back panel including upper and lower movable cushion assemblies and means mounting said movable cushion assemblies on said back panel for movement between (1) an adult mode position wherein said movable cushion assemblies are disposed within the space between the side cushions and provide adult back cushion means for engaging the middle of the back of an adult seat occupant sitting on the seat cushion, and (2) a child mode position wherein said movable cushion assemblies extend from the space between the side cushions and said cushion assembly means provides a cushioned child's seat including said lower movable cushion assembly extending from the bottom of the space in overlying relation to the seat cushion, a cushioned child's seat back extending upwardly from said cushioned child's seat within the space between the side cushions, and a cushioned child's head support including said upper movable cushion assembly above the cushioned child's seat back, a child's seat belt assembly connected with said back panel and extending forwardly of said cushioned child's seat back for extension over the shoulders of a child sitting on the cushioned child's seat, said lower movable cushion assembly providing a rigid anchor point for the small child's seat belt assembly between the legs of a small child sitting on said cushioned child's seat.

31. A child's seat module as defined in claim 30 wherein said lower movable cushion assembly includes a rigid seat structure, said mounting means for said movable cushion assemblies including means for pivotally connecting said rigid seat structure with said back panel for pivotal movement about a generally horizontally extending axis so that (1) in said adult mode position said lower movable cushion assembly extends within a lower end portion of said space and (2) in said child mode position said lower movable seat cushion assembly extends forwardly from the lower end portion of the space in supported relation on the seat cushion.

32. A child's seat module as defined in claim 31 wherein said upper movable cushion assembly includes a rigid head structure, said mounting means for said movable cushion assemblies including means for pivotally connecting said rigid seat structure with said back panel for pivotal movement about a generally horizontally extending axis so that (1) in said adult mode position said upper movable head cushion assembly extends within said space between upper end portions of the side cushions and (2) in said child mode position said upper movable cushion assembly extends upwardly from the space above the upper end portions of the side cushions and provides the cushioned child's head support.

33. A child's seat module as defined in claim 32 wherein said cushion assembly means includes a cushion pad and means for detachably mounting said cushion pad on said back panel in a position to provide said cushioned child's seat back and extending forwardly over said lower movable cushion assembly to provide therewith said cushioned child's seat.

34. A child's seat module as defined in claim 31 wherein said rigid head structure is pivotally mounted on said back panel by means including a latch mechanism for releasably retaining said upper cushion assembly in said adult mode position and in said child mode position.

35. A child's seat module as defined in claim 34 wherein said latch mechanism comprises a latch cam pivotally mounted at one side of said back panel and having a leg extension secured to a side of said rigid head structure and a pair of oppositely disposed notches formed thereon, latch means pivotally mounted on said one side of said back panel and having a nose projection formed thereon, spring means operatively connected to said latch means for urging said nose projection into one of said pair of oppositely disposed notches when said upper movable cushion assembly is in said adult mode movable position, and into the other of said notches when said upper movable cushion assembly is in said child mode position, and release means operatively connected to said latch means for manually releasing said nose projection from said respective notches against the force of said spring means to permit manual movement of said upper movable cushion assembly from one of said positions to the other.

36. A child's seat module as defined in claim 35 wherein said latch means is pivotally mounted on a rivet at an intermediate point along the length thereof, said nose projection is formed on one end thereof, and said spring means is operatively connected to the other end thereof.

37. A child's seat module as defined in claim 35 wherein a pair of spaced apart hinge plates are secured to said one side of said back panel, and wherein each of said latch means and said latch cam are pivotally mounted intermediate said pair of spaced apart hinge plates.

38. A child's seat module as defined in claim 35 wherein a second latch cam and cooperating inertia latch means are mounted at the other side of said back panel and operatively connected to said head rigid structure.

39. A child's seat module as defined in claim 35 wherein the angular relationship of the upper side of said nose projection in engagement with said one of said oppositely disposed notches of said latch cam is on the order of 20° from horizontal.

40. A child's seat module as defined in claim 35 wherein the angular relationship of the upper end of said latch means adjacent said nose projection in engagement with said latch cam adjacent the upper side of said other of said oppositely disposed notches of said latch cam is on the order of 15° with respect to a line drawn through the pivot point of said latch cam and along the lower engaged surfaces of said nose projection and said other of said oppositely disposed notches.

41. A child's seat module as defined in claim 35 wherein the angular relationship between the lower side of said nose projection in engagement with said other of said oppositely disposed notches of said latch cam is between 90° and 97° as measured between a first line drawn along the lower engaged surfaces and through the pivot point of said latch cam and a second line drawn through the pivot point of said latch means and through the midpoint of said lower engaged surfaces.

42. A child's seat module as defined in claim 34 wherein said latch mechanism comprises a first latch cam pivotally mounted at one side of said back panel and having a leg extension secured to a side of said rigid head structure and a pair of oppositely disposed notches formed thereon, latch means pivotally mounted on said one side of said back panel and having a nose projection formed thereon, spring means operatively connected to said latch means for urging said nose projection into one of said pair of oppositely disposed notches when said upper movable cushion assembly is in said child mode position, and release means operatively connected to said latch means for manually releasing said nose projection from said respective notches against the force of said spring means to permit manual movement of said upper movable cushion assembly from one of said positions to the other; and a second latch cam mounted on the other side of said back panel, and inertia latch means mounted on said other side for cooperation with said second latch cam while said upper movable cushion assembly is in said child mode position.

43. A child's seat module as defined in claim 42 wherein said second latch cam includes a step formed on an outer periphery thereof, and a leg extension secured to the other side of said head rigid structure, and said cooperating inertia latch means is pivotally mounted above a center of gravity point thereon and an arcuate-shaped edge formed on an upper side thereof, said second latch cam being adapted to contact said arcuate-shaped edge and cause said latching finger to engage said step when said movable head cushion assembly is moved upwardly from said adult mode position.

44. A child's seat module as defined in claim 42 wherein said back panel has a pair of spaced-apart hinge plates secured to the other side thereof and each of said second latch cam and said inertia latch means are pivotally mounted intermediate pair of spaced apart hinge plates.

45. A child's seat module as defined in claim 44 wherein said second spring means is operative between said pair of spaced-apart hinge plates and said second latch cam for projecting said second latch cam outwardly when said nose projection is manually released from said one of said pair of oppositely disposed notches.

46. A child's seat module as defined in claim 45 wherein said second spring means is a substantially arcuate-shaped leaf spring having a base secured to said pair of hinge plates.

47. A child's seat module for mounting on a seat back frame of a vehicle seat having a seat cushion and spaced apart side cushions on the seat back frame defining a child-receiving space therebetween, said child's seat module comprising a rigid back panel of a size to fit within the space between the side cushions having means for engaging with the seat back frame forwardly thereof within a rearward portion of the space between the side cushions for fixed securement thereto, cushion assembly means mounted on said back panel including movable cushion assembly means and means for mounting said movable cushion assembly means for movement between (1) an adult mode position wherein said movable cushion assembly means is disposed within the space between the side cushions and provide adult back cushion means for engaging the middle of the back of an adult seat occupant sitting on the seat cushion, and (2) a child mode position wherein said movable cushion assembly means extends from the space between the side cushions and said cushion assembly means provides a cushioned child's seat extending from the bottom of the space in overlying relation to the seat cushion, a cushioned child's seat back extending upwardly from said cushioned child's seat within the space between said side cushions, and a cushioned child's head support above the cushioned child's seat back, a child's seat belt assembly connected with said back panel and extending forwardly of said cushioned child's seat back for extension over the shoulders of a child sitting on the cushioned child's seat, said movable cushion assembly means including a movable seat cushion assembly having a rigid seat structure providing a rigid anchor point for the small child's seat belt assembly between the legs of a small child sitting on said cushioned child's seat, said child's seat belt assembly including a crotch belt connected at one end thereof to the rigid seat structure to extend therefrom at said anchor point, a buckle connected to the distal end of said crotch belt, and a restraint harness including twin shoulder belts extending through openings formed in said back panel and having connectors operatively connected thereto for connection with said buckle, a dividing bracket for connecting the ends of said twin shoulder belts behind said back panel to a single seat belt extending through a lower opening adjacent the bottom of said back panel and thence through a rear opening in said rigid seat structure to extend beneath the latter to emerge through a front opening in said rigid seat structure, and tension adjuster means operatively connected to said single seat belt intermediate said front and rear openings, said tension adjuster means including means extending to a position to be adjusted at a forward portion of said movable seat cushion assembly.

48. A child's seat module as defined in claim 47 and extensions of said twin shoulder belts through said connector members serving as thigh belts and each said twin shoulder belt secured at one end thereof to respective rear corners of said seat rigid structure.

49. A child's seat module as defined in claim 47 wherein said rigid seat structure includes a continuous trough portion formed therein a predetermined distance from an outer peripheral edge thereof and defining a central portion; a first plurality of spaced-apart holes formed in a frame-like ledge portion intermediate said trough portion and said outer edge; a flat retainer mounted on said ledge portion, including a second plurality of holes aligned with said first plurality of holes and a flange formed on the inner edge of said flat retainer for mounting in said trough; a plurality of fasteners mounted through said aligned first and second pluralities of holes; said movable seat cushion assembly including a foam cushion and a cover wrapped around said foam cushion, said flat retainer, and said flange to said central portion so as to be retained in said trough by said flange.

50. A child's seat module as defined in claim 49 wherein said ledge portion intermediate the trough and the outer edge is on a plane lower than the central portion defined by said continuous trough, such that the outer surface of said flat retainer and overlying cover is coplanar with said central portion.

* * * * *

UNITED STATES PATENT AND TRADEMARK OFFICE
CERTIFICATE OF CORRECTION

PATENT NO. : 5,224,756

DATED : July 6, 1993

INVENTOR(S) : Matthew Dukatz et al.

It is certified that error appears in the above-identified patent and that said Letters Patent is hereby corrected as shown below:   On the title page: Item

[73]   The assignee should read:  Chrysler Corporation, Highland Park, Michigan; Atoma International Inc., Newmarket, Ontario, Canada.

[56]   The third item listed under "FOREIGN PATENT DOCUMENTS" should read:
2665399   2/1992   European Pat. Off.

The Attorney, Agent, or Firm designated should read:
Raymond F. Lippitt; Edward P. Barthel.

Signed and Sealed this

Fourth Day of April, 1995

*Attest:*

BRUCE LEHMAN

*Attesting Officer*      Commissioner of Patents and Trademarks